(12) United States Patent
Zanetti et al.

(10) Patent No.: US 8,635,030 B2
(45) Date of Patent: Jan. 21, 2014

(54) METHOD FOR THE DETERMINATION OF A NOX CONCENTRATION VALUE UPSTREAM OF A SCR CATALYST IN A DIESEL ENGINE

(75) Inventors: Igor Zanetti, Frankfurt (IT); Davide Mercuri, Turin (IT); Marco Petronzi, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 251 days.

(21) Appl. No.: 13/167,910

(22) Filed: Jun. 24, 2011

(65) Prior Publication Data

US 2011/0320132 A1 Dec. 29, 2011

(30) Foreign Application Priority Data

Jun. 24, 2010 (GB) .................................. 1010627.6

(51) Int. Cl.
*G01N 31/00* (2006.01)
*G01M 15/00* (2006.01)
*F01N 3/00* (2006.01)

(52) U.S. Cl.
USPC ............................. 702/23; 73/114.71; 60/276

(58) Field of Classification Search
USPC ........... 702/23, 22, 24, 27, 29–31, 81, 84–85, 702/99–100, 104, 127, 182–183, 189; 60/272–273, 276; 73/114.69, 114.71, 73/114.73, 114.75
See application file for complete search history.

(56) References Cited

U.S. PATENT DOCUMENTS 6,427,439 B1    8/2002  Xu et al.

FOREIGN PATENT DOCUMENTS

| EP | 1801376 A1 | 6/2007 |
|---|---|---|
| WO | 03031782 A1 | 4/2003 |
| WO | 2004109072 A1 | 12/2004 |
| WO | 2009141918 A1 | 11/2009 |

OTHER PUBLICATIONS

Willems et al., Is Closed-Loop SCR Control Required to Meet Future Emission Targets?, 2006 SAE International, 11 pp.*

* cited by examiner

*Primary Examiner* — Toan Le
(74) *Attorney, Agent, or Firm* — Ingrassia Fisher & Lorenz, P.C.

(57) ABSTRACT

A method is provided for the determination of a NOx concentration value upstream of a Selective Catalytic Reduction (SCR) catalyst in a Diesel engine, the engine having an exhaust line, a Diesel Particulate Filter and a NOx concentration sensor downstream of the SCR catalyst, the method including, but is not limited to estimating the NOx concentration value upstream of the SCR catalyst as a function of at least two engine parameters, measuring the NOx concentration downstream of the SCR catalyst, calculating the difference $Z(x, y)$ between the estimated NOx concentration value and the measured value and, in case the difference is higher than a predetermined threshold, correcting the estimated NOx concentration value with a NOx concentration correction value. The NOx concentration correction value is calculated using a correction map that correlates the at least two engine parameters and the difference $Z(x, y)$ with the NOx concentration correction value.

18 Claims, 3 Drawing Sheets

METHOD FOR THE DETERMINATION OF A NOX CONCENTRATION VALUE UPSTREAM OF A SCR CATALYST IN A DIESEL ENGINE

CROSS-REFERENCE TO RELATED APPLICATION

This application claims priority to British Patent Application No. 1010627.6, filed Jun. 24, 2010, which is incorporated herein by reference in its entirety.

TECHNICAL FIELD

The technical field relates to a method for the determination of a NOx concentration value upstream of a SCR catalyst in a Diesel engine.

BACKGROUND

A Diesel engine is conventionally equipped with an after-treatment system that comprises an exhaust pipe, for leading the exhaust gas from the engine to the environment, and a plurality of after-treatment devices located in the exhaust pipe, for degrading and/or removing pollutants from the exhaust gas before discharging it into the environment.

In greater details, a conventional after-treatment system generally comprises a Diesel Oxidation Catalyst (DOC), for oxidizing hydrocarbon (HC) and carbon monoxides (CO) into carbon dioxide ($CO_2$) and water ($H_2O$), and a Diesel Particulate Filter (DPF), located in the exhaust pipe downstream the DOC, for removing diesel particulate matter or soot from the exhaust gas. In order to reduce NOx emissions, most after-treatment systems further comprise a Selective Catalytic Reduction (SCR) catalyst, which is located in the exhaust pipe downstream the DPF.

The SCR catalyst is a catalytic device wherein the nitrogen oxides (NOx) contained in the exhaust gas are converted into diatomic nitrogen ($N_2$) and water ($H_2O$), with the aid of a gaseous reducing agent, typically ammonia ($NH_3$), which is stored inside the catalyst. Ammonia is obtained through thermo-hydrolysis of a Diesel Exhaust Fluid (DEF), typically urea ($CH_4N_2O$), which is injected into the exhaust pipe through a dedicated injector located between the DPF and the SCR catalyst.

The injection of DEF is managed by an engine control unit (ECU) that calculates the quantity of DEF to be injected in the exhaust pipe, in order to achieve an adequate NOx conversion rate inside the SCR catalyst, and then commands the injector accordingly. Usually the DEF quantity to be injected is determined on the basis of the level of NOx stored inside the SCR catalyst. This parameter is measured by means of a NOx sensor placed upstream of the SCR catalyst.

A problem with this approach is that a dedicated NOx sensor upstream of the SCR catalyst is needed. Removal of said dedicated NOx sensor would be desirable while still having a reliable NOx concentration value upstream of the SCR catalyst to use for the DEF quantity determination.

At least one object is therefore to provide for a reliable estimation of the value of NOx concentration upstream the SCR catalyst without using a dedicated sensor. A further object of an embodiment is to provide for an accurate estimation of the value of NOx concentration upstream the SCR catalyst that has a high reliability over time. Another object is to provide for an estimation of the value of NOx concentration upstream the SCR catalyst without using complex devices and by taking advantage from the computational capabilities of the Electronic Control Unit (ECU) of the vehicle. In addition, other objects, desirable features and characteristics will become apparent from the subsequent summary and detailed description, and the appended claims, taken in conjunction with the accompanying drawings and this background.

SUMMARY

An embodiment provides for a method for the determination of a NOx concentration value upstream of a Selective Catalytic Reduction (SCR) catalyst in a Diesel engine, the engine having an exhaust line, a Diesel Particulate Filter and a NOx concentration sensor downstream of the SCR catalyst, the method comprising estimating the NOx concentration value upstream of the SCR catalyst as a function of at least two engine parameters, measuring the NOx concentration downstream of the SCR catalyst, calculating the difference Z(x, y) between the estimated NOx concentration value and the measured value and, in case said difference is higher than a predetermined threshold, correcting said estimated NOx concentration value with a NOx concentration correction value, wherein said NOx concentration correction value is calculated using a correction map that correlates said at least two engine parameters and said difference Z(x, y) with said NOx concentration correction value.

Advantageously, this embodiment grants a dynamic correction of the NOx concentration estimation along the whole life cycle of the engine. According to another embodiment, the calculation of the difference Z(x, y) is performed after a DPF regeneration process. This embodiment advantageously allows comparing the values which refer to the NOx concentration upstream and downstream of the SCR catalyst when the SCR catalyst is almost empty and therefore there is no NOx conversion: in this way the two signals can be appropriately compared in order to correct subsequent deviations of the estimation.

According to still another embodiment, the difference Z(x, y) is corrected according to:

$$Z_{(x,y)} = \frac{NOx_{meas} - NOx_{est}}{\sigma_{NOx}(NOx_{meas})}$$

Where $NOx_{meas}$ represents the measured NO value and $\sigma NOx$ represents the sensor standard deviation of the measured values and $NOx_{est}$ is the estimated value of the NOx concentration and x and y represents said two engine parameters. Advantageously, this embodiment takes into account, among other things, the characteristics of the sensor.

According to still another embodiment, the correction map is recalculated as a function of an update rate a (alpha) determined experimentally. Advantageously, this embodiment allows predefining the relative importance of the new value of the correction map with respect to the old.

Another embodiment provides for the fact that the at least two engine parameters are engine speed and engine load or oxygen concentration and exhaust gas temperature. Advantageously, these parameters are chosen from parameters that are both available to the ECU and are strictly correlated to the NOx emission.

The method can be carried out with the help of a computer program comprising a program-code for carrying out all the steps of the method described above, and in the form of computer program product comprising the computer program. The computer program product can be embodied as a control apparatus for an internal combustion engine, comprising an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

The method according can be also embodied as an electromagnetic signal, said signal being modulated to carry a sequence of data bits which represents a computer program to carry out all steps of the method.

A still further aspect of the disclosure provides an internal combustion engine specially arranged for carrying out the method claimed.

BRIEF DESCRIPTION OF THE DRAWINGS

The present invention will hereinafter be described in conjunction with the following drawing figures, wherein like numerals denote like elements, and.

DETAILED DESCRIPTION OF THE DRAWINGS

The following detailed description is merely exemplary in nature and is not intended to limit application and uses. Furthermore, there is no intention to be bound by any theory presented in the preceding background or summary or the following detailed description.

Figure 1:
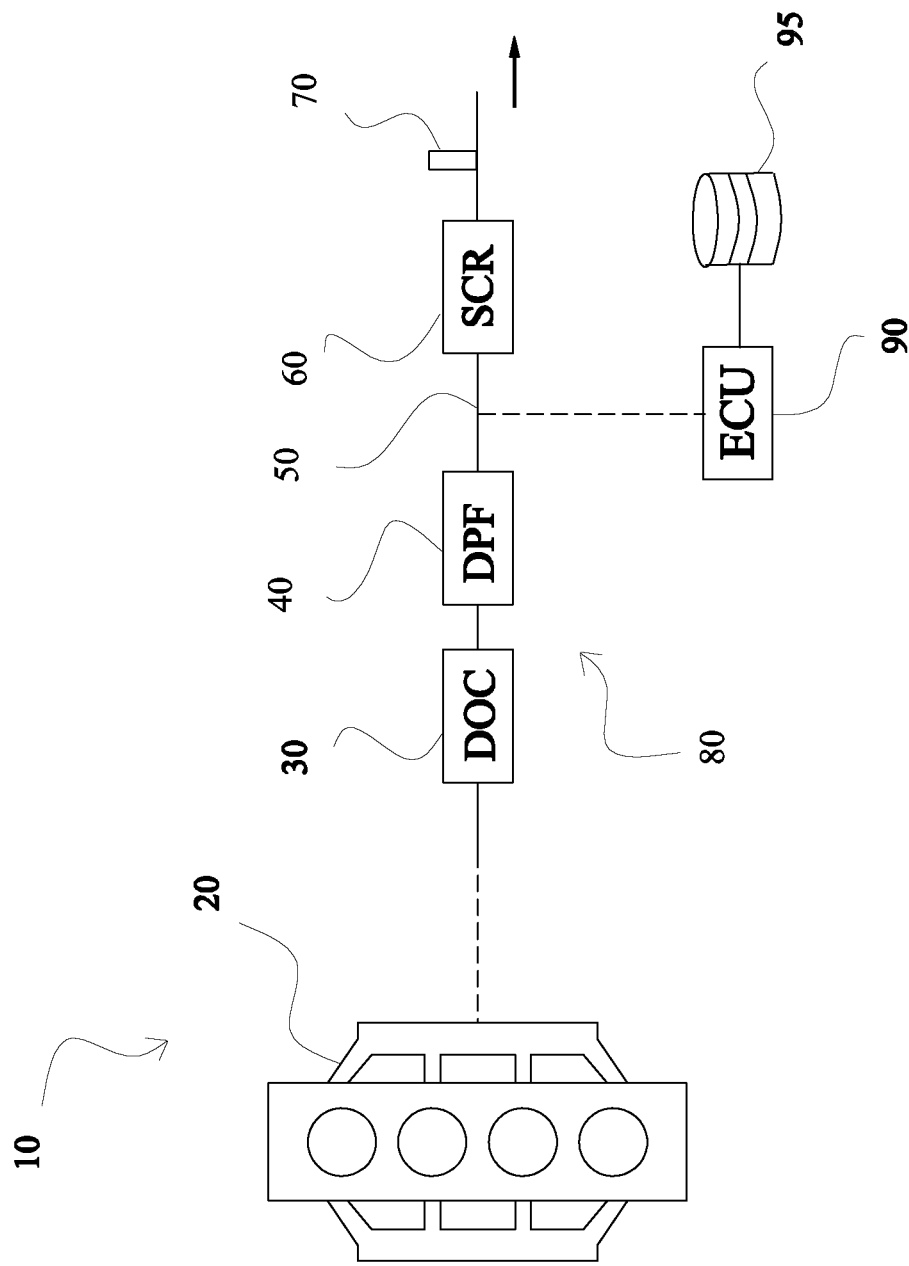
FIG. 1 is a schematic representation of a Diesel engine to which an embodiment is applied.

In FIG. 1 a schematic representation of a Diesel engine, globally indicated with reference numeral 10, to which an embodiment of the invention is applied, with emphasis only on the relevant engine and after-treatment system components for understanding the embodiments of the invention. In FIG. 1 an engine 20 is depicted schematically, said engine 20 having an exhaust line 80 in which, sequentially, a Diesel Oxidation Catalyst (DOC) 30, a Diesel Particulate Filter (DPF) 40 and a Selective Catalytic Reduction (SCR) catalyst 60 are placed.

The DOC 30 is used for oxidizing hydrocarbon (HC) and carbon monoxides (CO) into carbon dioxide ($CO_2$) and water ($H_2O$) and the DPF is used for removing diesel particulate matter or soot from the exhaust gas. The SCR catalyst is used as a catalytic device to convert the nitrogen oxides (NOx) contained in the exhaust gas into diatomic nitrogen ($N_2$) and water ($H_2O$). The engine 20 and the after-treatment system are managed by an Electronic Control Unit (ECU) 90, having an associated data carrier 95.

Downstream of the SCR catalyst 60, a NOx concentration sensor 70 is provided, while in the portion 50 of exhaust line upstream of the SCR catalyst no NOx concentration sensors are present. In order to estimate the NOx concentration value upstream of the SCR catalyst in a Diesel engine the following method is used.

A model for NOx estimation upstream the SCR catalyst is provided having an integrated auto-adaptive logic to increase the accuracy of the NOx concentration estimation based on the NOx measurement downstream the SCR catalyst. The model features a Basic Map for the NOx concentration estimation, where said map may be based on engine speed and load or on oxygen concentration and exhaust gas temperature. Namely, as a first step, the NOx concentration value in the line 50 upstream of the SCR catalyst 60 is estimated as a function of at least two engine parameters.

Figure 2:
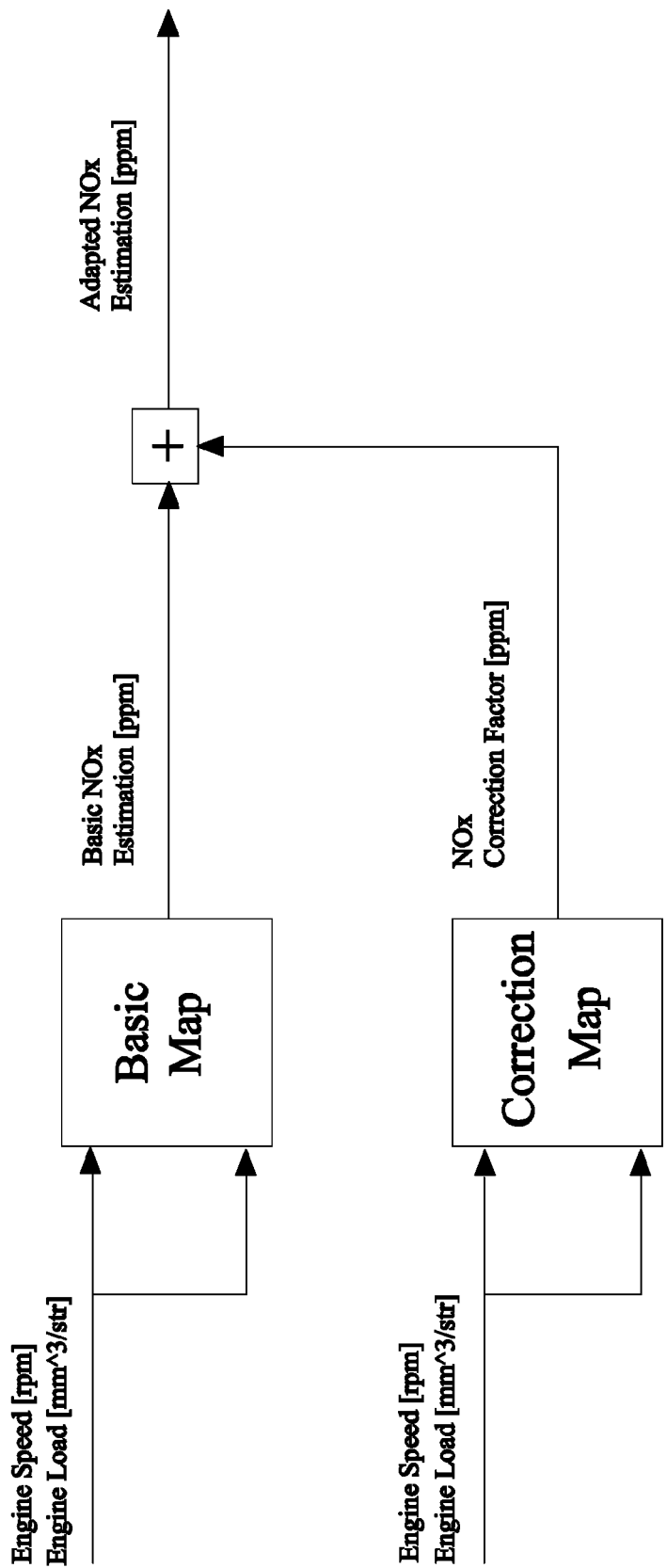
FIG. 2 is a schematic representation of the logic of the estimation method according to an embodiment.

For example, in FIG. 2 such operation is represented as a Basic Map that correlates Engine Speed and Engine Load to a Basic NOx concentration value estimation. In practical terms, the Basic Map may be constituted, for example, by a two-entry matrix that correlates Engine Speed and Engine Load values to corresponding NOx concentration values and such map may be determined by means of experimental tests on the engine to which it is applied.

However, since during the life of the engine the Basic Map may become outdated due, for example, to components drift or to other causes, the output of the Basic Map is corrected by an additive contribution, coming from a Correction Map based on the same input parameters as the Basic Map (FIG. 2). The Correction Map is another two-entry matrix that correlates Engine Speed and Engine Load values to corresponding NOx concentration values that are initially set all equal to zero since no correction is initially needed to the Basic Map. However, the Correction Map is subsequently subjected to a set of learning phases in which it is modified in order to take into account components drift and other phenomena that have a negative impact during the life of the engine on the reliability of the estimation given by the Basic Map.

The learning phases are used to modify the values of the Correction Map on the basis of the difference of the value of NOx concentration estimated by the Basic Map and of the value measured by the NOx concentration sensor 70 downstream of the SCR catalyst 60. Since, as a general rule, the values of NOx concentration upstream and downstream of the SCR catalyst 60 are different, it is necessary to subject the Correction Map to the above learning phases in cases in which it is possible to assume that the values of NOx concentration upstream and downstream of the SCR catalyst 60 are substantially equal. In these cases the values obtained for the Correction Map are the correct ones. In particular, this condition may be verified when the SCR catalyst 60 is empty, namely after a DPF 40 regeneration process.

In fact, since during a DPF 40 regeneration process the SCR catalyst 60 is subjected to very high temperatures, this fact brings the NH3 storage on the SCR catalyst substrate to almost drop to zero ($NH_3$ storage capacity decreases with the increase of the substrate temperature), which gives, for a short time after the end of the DPF regeneration phase, a zero NOx conversion efficiency condition, thus allowing to compare the output of the estimated value of the NOx concentration upstream the SCR catalyst 60 to the reading of the NOx sensor 70 downstream the SCR catalyst 60.

A difference between these two values can therefore be calculated and, if said difference is greater than a predetermined threshold, then the Correction Map will be updated, in particular taking into account the above mentioned difference. In particular, the difference between estimated and measured NOx concentration values may be corrected, for example, according to the following Equation (1):

$$Z_{(x,y)} = \frac{NOx_{meas} - NOx_{est}}{\sigma_{NOx}(NOx_{meas})} \quad (1)$$

In Equation (1), $Z(x, y)$ represents the difference between estimated and measured NOx concentration values, $NOx_{meas}$ represents the NOx concentration value measured by sensor 70, $NOx_{est}$ represents the estimated NOx concentration value and $\sigma NOx$ represents the sensor standard deviation (as a function of the NOx value measured by the sensor).

Figure 3:
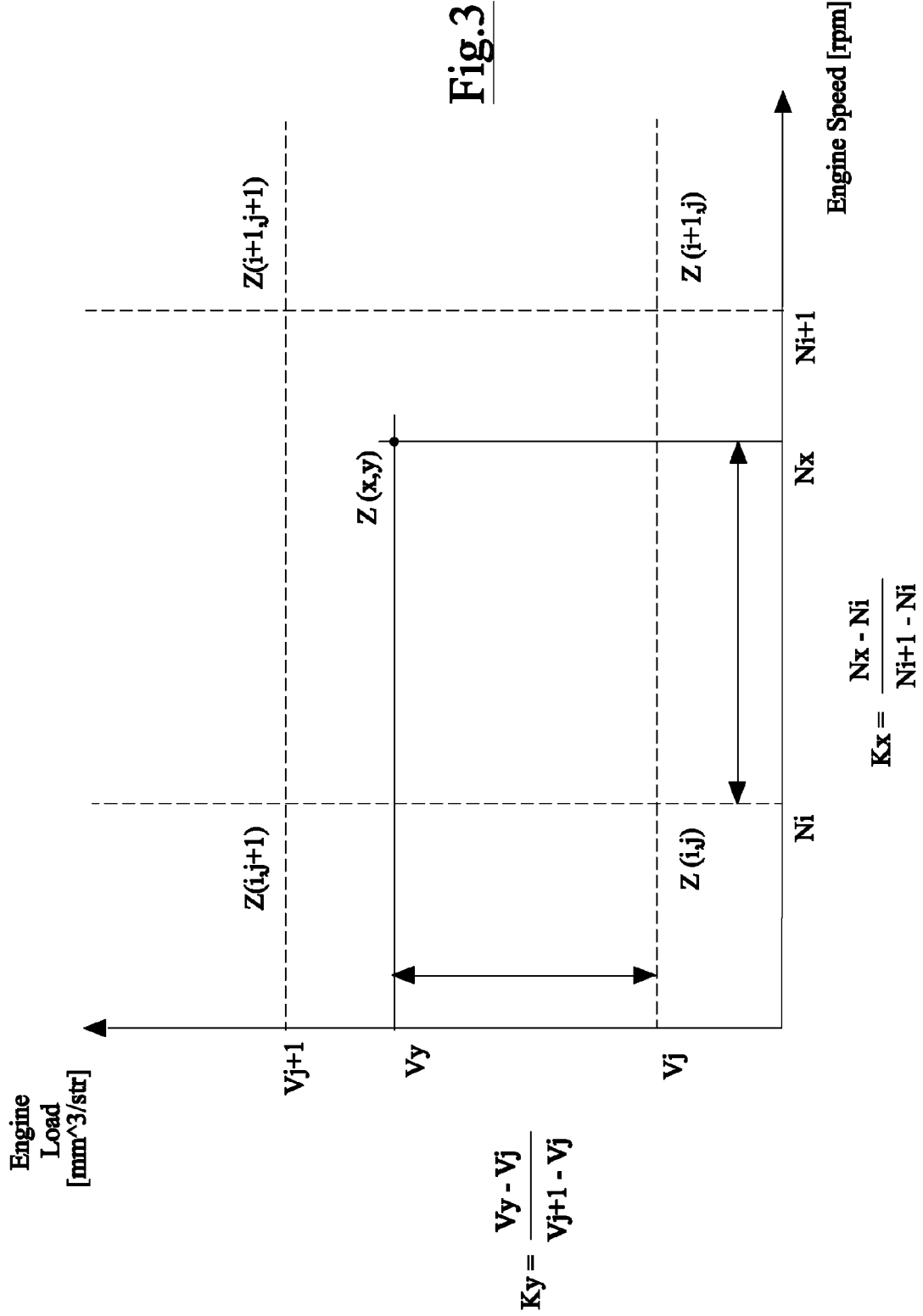
FIG. 3 is a schematic representation of the update of a Correction Map used in the estimation method according to an embodiment.

The parameters x and y may represent two engine parameters such as engine speed and engine load, as in the exemplary FIG. 2 and FIG. 3, or oxygen concentration and exhaust gas temperature or any other couple of parameters deemed suitable. The difference Z(x, y) is then used to recalibrate the Correction Map. An example of such Map is represented in FIG. 3. In this case the value Z(x, y) is plotted in a plane defined by an Engine Speed x-axis and an Engine Load y-axis.

Initially, the points Z(i,j), Z(i,j+1), Z(i+1,j) and Z(i+1,j+1) define values, defined also as breakpoints, of the Basic Map, while at every subsequent learning phase they will define values of the Correction Map calculated in the preceding learning phase. In this way it is possible to calculate the weighing factors kx and ky for breakpoints surrounding the point Z(x, y) derived from equation (1) using the following Equations (2) and (3):

$$k_x = \frac{N_x - N_i}{N_{i+1} - N_i} \quad (2)$$

$$k_y = \frac{V_y - V_j}{V_{j+1} - V_j} \quad (3)$$

With these weighing factors it is possible to update dynamically the Correction Map at every new learning phase, using a predefined update rate a (alpha) that represents the relative importance of the new value with respect to the preceding one present in the map. The update rate a (alpha) may be set experimentally depending, for example, on the engine and on the confidence in the subsequent learning phases or other factors.

For the dynamic update of the Correction Map values, the following equations (4.a)-(4.d) may be used:

$$Z(i,j) = (1-a)*Z(i,j)\text{old} + a*(1-kx)*(1-ky)*Z(x,y) \quad (4.a)$$

$$Z(i,j+1) = (1-a)*Z(i,j+1)\text{old} + a*(1-kx)*(ky)*Z(x,y) \quad (4.b)$$

$$Z(i+1,j) = (1-a)*Z(i+1,j)\text{old} + a*(kx)*(1-ky)*Z(x,y) \quad (4.c)$$

$$Z(i+1,j+1) = (1-a)*Z(i+1,j+1)\text{old} + a*(kx)*(ky)*Z(x,y) \quad (4.d)$$

In these equations, the first addendum represents the old value of the Correction Map corrected with the update rate a, while the second addendum represents the new value Z(x,y) derived from the difference between the measured value of the NOx concentration value measured by sensor 70 and the estimated NOx concentration value also corrected with the update rate a and the weighing factors kx and ky. These operations are repeated, during the subsequent learning phases, only for the points around the zone considered for each learning phase, in order to arrive at an updated Correction Map, then the updated Correction Map is used additively as exemplified in FIG. 2 in order to arrive to a corrected estimation of the NOx concentration value.

The above described method allows for a dynamic correction of the NOx concentration value estimation along the whole life cycle of the engine. Also, the above method avoids the problem of an incorrect NOx concentration value due to components drift or other external factors, by adapting the estimation to the changed conditions of the engine during time.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A method for determination of a NOx concentration value upstream of a Selective Catalytic Reduction (SCR) catalyst in a Diesel engine, the Diesel engine comprising an exhaust line, a Diesel Particulate Filter (DPF) and a NOx concentration sensor downstream of the SCR catalyst, the method comprising:
   estimating, at a control apparatus, the NOx concentration value upstream of the SCR catalyst as a function of at least two engine parameters to provide an estimated value;
   measuring the NOx concentration value downstream of the SCR catalyst using the NOx concentration sensor to provide a measured value;
   calculating a difference Z(x, y) between the estimated value and the measured value; and
   correcting, with the control apparatus, said estimated value with a NOx concentration correction value if said difference is higher than a predetermined threshold,
   wherein said NOx concentration correction value is calculated using a correction map that correlates said at least two engine parameters and said difference Z(x, y) with said NOx concentration correction value.

2. The method according to claim 1, wherein the calculating the difference Z(x, y) is performed after a DPF regeneration process.

3. The method according to claim 1, wherein the difference Z(x, y) is corrected according to:

$$Z_{(x,y)} = \frac{NOx_{meas} - NOx_{est}}{\sigma_{NOx}(NOx_{meas})}$$

wherein $NOX_{meas}$ represents the measured value and σNOx represents a sensor standard deviation of the measured value and $NOX_{est}$ is the estimated value of the NOx concentration value and x and y represents said at least two engine parameters.

4. The method according to claim 1, further comprising recalculating the correction map as a function of an update rate that is determined experimentally.

5. The method according to claim 1, wherein the at least two engine parameters are engine speed and engine load.

6. The method according to claim 1, wherein the at least two engine parameters are oxygen concentration and exhaust gas temperature.

7. A Diesel engine, comprising:
   an exhaust line;
   a Diesel Particulate Filter (DPF);
   an SCR catalyst located in said exhaust line;
   a NOx concentration sensor downstream of the SCR catalyst; and
   an Electronic Control Unit configured to:
     estimate a NOx concentration value that is upstream of the SCR catalyst as a function of at least two engine parameters to provide an estimated value;

measure the NOx concentration value that is downstream of the SCR catalyst to provide a measured value;

calculate a difference Z(x, y) between the estimated value and the measured value; and correct said estimated value with a NOx concentration correction value if said difference is higher than a predetermined threshold, wherein said NOx concentration correction value is calculated using a correction map that correlates said at least two engine parameters and said difference Z(x, y) with said NOx concentration correction value.

8. The Diesel engine according to claim 7, wherein the calculating the difference Z(x, y) is performed after a DPF regeneration process.

9. The Diesel engine according to claim 7, wherein the difference Z(x, y) is corrected according to:

$$Z_{(x,y)} = \frac{NOx_{meas} - NOx_{est}}{\sigma_{NOx}(NOx_{meas})}$$

wherein $NOX_{meas}$ represents the measured value and σNOx represents a sensor standard deviation of the measured value and $NOX_{est}$ is the estimated value of the NOx concentration value and x and y represents said at least two engine parameters.

10. The Diesel engine according to claim 7, wherein the Electronic Control Unit is further configured to recalculate the correction map as a function of an update rate that is determined experimentally.

11. The Diesel engine according to claim 7, wherein the at least two engine parameters are engine speed and engine load.

12. The Diesel engine according to claim 7, wherein the at least two engine parameters are oxygen concentration and exhaust gas temperature.

13. A non-transitory computer readable medium embodying a computer program product containing computer instructions stored therein for causing a computer processor to perform:

a determination program for determination of a NOx concentration value upstream of a Selective Catalytic Reduction (SCR) catalyst in a Diesel engine, the Diesel engine comprising an exhaust line, a Diesel Particulate Filter (DPF) and a NOx concentration sensor downstream of the SCR catalyst, the determination program configured to:

estimate the NOx concentration value that is upstream of the SCR catalyst as a function of at least two engine parameters to provide an estimated value;

measure the NOx concentration value that is downstream of the SCR catalyst to provide a measured value;

calculate a difference Z(x, y) between the estimated value and the measured value; and correct said estimated value with a NOx concentration correction value if said difference is higher than a predetermined threshold, wherein said NOx concentration correction value is calculated using a correction map that correlates said at least two engine parameters and said difference Z(x, y) with said NOx concentration correction value.

14. The computer readable medium embodying the computer program product according to claim 13, wherein the calculating the difference Z(x, y) is performed after a DPF regeneration process.

15. The computer readable medium embodying the computer program product to claim 13, wherein the difference Z(x, y) is corrected according to:

$$Z_{(x,y)} = \frac{NOx_{meas} - NOx_{est}}{\sigma_{NOx}(Nox_{meas})}$$

wherein $NOX_{meas}$ represents the measured value and σNOx represents a sensor standard deviation of the measured value and $NOX_{est}$ is the estimated value of the NOx concentration value and x and y represents said at least two engine parameters.

16. The computer readable medium embodying the computer program product according to claim 13, the determination program further configured to recalculate the correction map as a function of an update rate that is determined experimentally.

17. The computer readable medium embodying the computer program product according to claim 13, wherein the at least two engine parameters are engine speed and engine load.

18. The computer readable medium embodying the computer program product according to claim 13, wherein the at least two engine parameters are oxygen concentration and exhaust gas temperature.

* * * * *